US005376451A

United States Patent [19]

Albin et al.

[11] Patent Number: 5,376,451

[45] Date of Patent: Dec. 27, 1994

[54] YELLOW COLOR-FORMERS

[75] Inventors: Loren D. Albin, Oakdale; Martha Jacobsen, Maplewood; David B. Olson, Marine, all of Minn.

[73] Assignee: Minnesota Mining and Manufacturing Company, St. Paul, Minn.

[21] Appl. No.: 545,551

[22] Filed: Jun. 29, 1990

[51] Int. Cl.[5] .......................... B01J 13/02; B01J 13/18; B41M 5/155

[52] U.S. Cl. .......................... 428/402.2; 428/402.21; 428/914; 503/218

[58] Field of Search ........... 428/402.2, 402.21, 402.22, 428/914; 8/526

[56] References Cited

U.S. PATENT DOCUMENTS

| | | | |
|---|---|---|---|
| 3,481,759 | 12/1969 | Ostlie | 264/4.7 X |
| 3,516,846 | 6/1970 | Matson | 264/4.7 X |
| 3,558,341 | 1/1971 | Phillips, Jr. | 428/402.2 X |
| 3,746,716 | 7/1973 | Tweit | 548/138 |
| 3,859,229 | 1/1975 | Brockett | 264/4.3 |
| 4,334,015 | 6/1982 | Yarian | 435/1 |

FOREIGN PATENT DOCUMENTS

| | | | |
|---|---|---|---|
| 2051848 | 1/1981 | United Kingdom | B41M 5/26 |

OTHER PUBLICATIONS

"Possible Antituberculous Compounds Synthesis of some New Salicylaldehyde-4-Aryl-3-Thiose-micarbazones", A. Wahab, *Egypt J. Chem.* 1978, 21, p. 403.

"Chemotherapy of Fungus Infections: Part III -Alkyl or Aryl Thiosemicarbazones, Acid Hydrazones & Styryl Aryl Ketones of 5-Bromo-& 5-Nitro-salicylaldehydes" *Indian Journal of Chemistry,* 1972, 10, p. 694.

"Chemotherapy of fungus Infections: Part II -Aliphatic & Aromatic Acid Hydrazones & Alkyl or Aryl Thiosemicarbazones of 5-Chlorosalicylaldehyde" *Indian Journal of Chemistry,* 1965, 5, p. 616.

"Arylbis(thiosemicarbazone) tellurium (II) chlorides; three coordinate tellurium (II) complexes", *Journal of Organometallic Chemistry,* 1988, 346, p. 349.

"Complexes of mercury(II) with the Thiosemicarbazones of Some Aromatic Aldehydes", *Russian Journal of Inorganic Chemistry,* 1975, 20, p. 850.

R. Stolle und P. E. Bowles: Uber Thiocarbohydrazid, *Chem. Ber.,* 1908, vol. 41 p. 1099.

Th. Curtius Und k. Heidenreich: Hydrazide der Koh- (List continued on next page.)

*Primary Examiner*—Richard D. Lovering

*Attorney, Agent, or Firm*—Gary L. Griswold; Walter N. Kirn; Gregory A. Evearitt

[57] ABSTRACT

This invention relates to improved imaging systems based on the formation of yellow colored coordination compounds of transition metals with certain ligands. These coordination compounds have been found to provide excellent yellow colors when used in pressure sensitive carbonless copy-papers wherein the image is formed by the reaction of a color-forming compound with transition metal salts such as those of nickel, cobalt, iron, copper, and similar materials. These yellow color-formers have the advantage of high solubility in encapsulation solvents and have less color on $Zn^{2+}$ containing CB sheets. Use of these yellow color-formers with other metal complex color-formers such as N-(monosubstituted)dithiooxamide color-formers and N,N'-(disubstituted)dithiooxamides results in the formation of black images.

6 Claims, 1 Drawing Sheet

OTHER PUBLICATIONS lensaure und der geschwefelten Kohlensauren, *Chem. Ber.* 1894, vol. 27, p. 55.
"The Chemistry of Carbohydrazide and Thiocarbohydrazide", *Chemical Review,* vol. 70, pp. 111-149 (1970).
"Derivadados En 1,5 De La Carbohidrazida, Tiocarbohidrazida Y Diaminoquanidina Con Saliciladlehido. Estudio Espectral De Los Reactivos Y Posibilidades Analiticas de Los Mismos", *An. Quim., Ser. B.* 1984, vol. 80, pp. 129-133.
"Magnetic and Spectral Properties of Nickel (II) Complexes With Thiocarbohydrazones", *Acta Chimica Hungarica,* 1983, vol. 113, pp. 129-137.
"Cobalt (II) And Copper (II) Complexes of Thiocarbohydrazones and Copper (II) Bimetallic Complexes of Nickel (II) Thiocarbohydrazones", *Acta Chimica Hungarica,* 1985, vol. 118, pp. 3-10.
"Complexes of Mn(II), Cr(III) and Fe(III) With Thiocarbohydrazones", *Acta Chimica Hungarica,* 1986, vol. 122, pp. 169-173.
"Heterocyclic Tautomerisms, III. An Investigation of the 2-Arylbenzothiazoline-2-(Benzylideneamino) thiophenol Tautomerism. Part 3.", *J. Heterocyclic Chem.,* 1968, vol. 5, pp. 509-512.
"Coordination Polymers of Schiff Base Ligands and Their Monomeric Analogs" *J. Inorgn. Nucl. Chem.,* 1973, vol. 35, pp. 2707-2717.
Chemical Abstracts, vol. 89, No. 24, Dec. 11, 1978, Abstract No. 208329j, "Metal complexes of salicylaldehyde-thiocarbohydrazone", p. 717.

YELLOW COLOR-FORMERS

BACKGROUND OF THE INVENTION

1. Field of Invention

The present invention relates to certain color-formers, to their reactions with metal salts to form colored coordination compounds, and to imaging systems based thereon. The formation of colored coordination compounds can be employed to generate images and is important in the manufacture and use of pressure sensitive transfer papers for preparing carbonless copies.

The invention also concerns the admixture of such color-formers with N-(monosubstituted)dithiooxamides and/or N,N'-(disubstituted)dithiooxamides to form images of various colors, preferably black, upon application of appropriate pressure to pressure sensitive imaging constructions such as carbonless paper constructions.

2. Information Disclosure Statement

The use of coordination compounds to form imaging sheets has been important in the field of pressure sensitive transfer papers useful for preparing carbonless copies. The present invention provides color-forming compositions which, when complexed with transition metal ions, provide compositions which appear as intensely yellow colored complexes. This is accomplished in the present invention by the use of certain colorless aromatic substituted thiosemicarbazone compounds, aromatic substituted thiocarbohydrazone compounds, or of certain 2-alkylthio-N-[(2-hydroxyaryl)methylene]aniline imine derivatives, any of which provide an intense yellow color when individually complexed with cations of certain transition metals as, for example, $nickel^{2+}$.

The aromatic substituted color-foraging compounds found to be useful in the present invention can be represented by the following formula:

$$Ar—CH=N—R \quad I$$

wherein Ar is aryl and preferably is selected from the group consisting of phenyl, substituted phenyl, naphthyl, and substituted naphthyl bearing a hydroxyl group adjacent (i.e., ortho) or pseudo-adjacent (i.e., peri) to the site of attachment of the linking carbon atom attached to the nitrogen atom; and R is selected from the group consisting of:

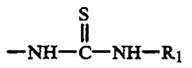 (i)

wherein $R_1$ is a substituent comprising hydrogen, alkyl, cycloalkyl, and aryl (preferably phenyl, substituted phenyl, naphthyl, and substituted naphthyl);

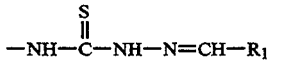 (ii)

wherein $R_1$ is as defined above; and

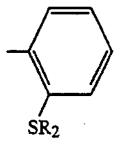 (iii)

wherein $R_2$ is selected from the group of substituents comprising hydrogen, alkyl, cycloalkyl, branched alkyl, substituted alkyl, and heteroalkyl (e.g. alkyl ethers, alkylamides, alkylesters, and disulfides).

The class of compounds, represented by (i) are known as thiosemicarbazones, which can be prepared by the reaction of a thiosemicarbazide with an aldehyde or ketone. The thiosemicarbazides themselves are prepared by the reaction of hydrazine with an isothiocyanate. Thiosemicarbazones have been investigated as antituberculosis agents (see Wahab, A. *Egypt J. Chem.* 1978, 21, 403), as chemotherapeutic agents in the treatment of fungus infections (see Bhat, A. K., et al. *Indian J. Chem.* 1972, 10, 694; Bhat, A. K., et al. ibid. 1967, 5, 616), and as intermediates in the preparation of antihypertensive agents (see Tweit, R. C. U.S. Pat. No. 3,746,716 (1973). Some metal complexes of thiosemicarbazones have been investigated. These thiosemicarbazones had a free $NH_2$ group at the 1-position (i.e., $R_1$=H). Coordination complexes with tellurium (see Singh, A. K.; Basumatary, J. K. *J. Organomet. Chem.* 1988, 346, 349) and mercury (see Chernova, T. N.; Lugovoi, S. V.; Chistota, V. D. *Russ. J. Inorg. Chem.* 1975. 20, 850) are known.

The class of compounds represented by (ii) are known as thiocarbohydrazones. The parent compound, thiocarbohydrazide, was first prepared by Stolle in 1908 (see Stolle, R.; Bowles, P. E. *Chem. Ber.* 1908, 41, 1099) by the reaction of hydrazine with thiophosgene or by the reaction of hydrazine with the hydrazine salt of dithiocarbazic acid. Hydrazine salts of dithiocarbazic acids were prepared earlier by Curtius (see Curtius, T.; Heidenreich, K. *Chem. Ber.* 1894, 27, 55). Stolle prepared thiocarbohydrazones by the reaction of thiocarbohydrazide with two molecules of an aldehyde. Kurzer and Wilkinson reviewed the chemistry and reactions of thiocarbohydrazide, carbohydrazide and related materials (see Kurzer, F.; Wilkinson, M. *Chem. Rev.* 1970, 70, 111). The reaction of thiocarbohydrazide with salicylaldehyde was reported by Gonzalez and coworkers who prepared 1,5-bis addition products (see Montana Gonzalez, M. T.; Gomez Ariza, J. L.; Garcia de Torres, A. *An. Quim., Ser. B* 1984, 80, 129). These workers were interested in the compounds as analytical reagents. They reported the Schiff bases exhibited several pK values, that they formed colors with transition metals and that the thiocarbohydrazide is very sensitive toward Fe(III) and In(III). Patil and coworkers studied the ML complexes (M=metal, L=ligand) of 1,5-bis(-salicylaldehyde)-3-thiocarbohydrazones with various substituents in the 5-position on the aromatic ring. They prepared the 1,5-bis(salicylaldehyde), 1,5-bis(5-chlorosalicylaldehyde), 1,5-bis(5-methylsalicylaldehyde), 1,5-bis(5-methoxysalicylaldehyde)compounds and determined that the nickel(II) complex was tetradentate (see Patil, S. A.; Badiger, B. M.; Kulkarni, V. H. *Acta Chim. Hung.* 1983, 113, 129). In further work, Patil and coworkers also prepared cobalt(II), copper(II), as well as the mixed copper(II)/nickel(II) bimetallic complex. They reported such properties as elemental analysis, magnetic moment, and spectra of the compounds. They also gave the bactericidal activity of the ligand and the complexes (see Patil, S. A.; Kulkarni, V. H. *Acta Chim. Hung.* 1985, 118, 3). This group later investigated the Mn(II), Cr(III) and Fe(III) complexes with these ligands (see Shivaprasad, K. H.; Patil, S. A.; Patil, B. R.; Kulkarni, V. H. *Acta Chim. Hung.* 1986, 122, 169.

The class of compounds represented by (iii) are variously known as imines, anils, or Schiff's bases and include 2-alkylthio-N-[(2-hydroxyaryl)methylene]aniline compounds. They are prepared by the condensation of a 2-alkylthioaniline with a 2-hydroxy-aromatic aldehyde. 2-methylthio-N-(salicylidene)aniline has been prepared (see Goetz, F. J. *J. Heterocyclic. Chem.* 1968, 5, 509) and is known to form coordination complexes with metals such as Ni(II), Co(II), Pd(II), and Cu(II) (see Dunski, N.; Crawford, T. H. *J. Inorg. Nucl. Chem.* 1973, 35, 2707).

In none of the above cases have the color-formers or coordination compounds been used in any imaging process, nor has any reference to imaging been made, nor has any mention of their encapsulation been disclosed.

In order to be useful in an imaging construction, it is desirable that the color-former be capable of being encapsulated and of rapidly forming a stable colored image upon contact with the metal cation on the receptor sheet. That is, the transition metal complex should form nearly instantaneously, so that the image is rapidly formed as the stylus pressure is applied to the backside of the donor sheet. This will help ensure formation of an accurate, almost instantly readable, copy. The image should also be relatively stable so that it does not substantially fade with time.

The color-forming composition of the present invention can be readily microencapsulated by techniques known in the art, for example as described in G. W. Matson, U.S. Pat. No. 3,516,846. Pressure-sensitive record and/or transfer sheets can be provided as are known in the art.

When the yellow color-formers of the present invention are used in admixture with certain conventional dithiooxamide derivative transition metal complexing compounds, the light absorption properties of the individual complexes are additive. For example, when a yellow color-former of this invention is mixed with a magenta color-former such as an N,N'-(disubstituted)dithiooxamide a red color is obtained upon imaging. When a yellow color-former of this invention is mixed with a cyan color-former such as an N-(monosubstituted)dithiooxamide a green image is formed. When a yellow color-former of this invention is mixed with an effective amount of both an N-(monosubstituted)dithiooxamide and an N,N'-(disubstituted)dithiooxamide, or mixtures thereof, a black image is afforded. Thus, it is possible to absorb a sufficient portion of light in the visible spectrum so as to provide a neutral black color.

The chemistry and characteristics of metal complexes of dithiooxamide compounds have been used commercially and certain dithiooxamide compounds have been used in commercially available carbonless paper products. One successful type of carbonless imaging chemistry takes advantage of the fact that dithiooxamide compounds are encapsulable and react readily with many transition metal salts to form coordination complexes. Generally, these dithiooxamide compounds comprise symmetrically disubstituted dithiooxamide compounds and include N,N'-dibenzyl-dithiooxamide and N,N'-di(2-octanoyloxyethyl)dithiooxamide.

Generally, transition metal salts are used to form coordination complexes with dithiooxamides. Salts which have been employed in the preparation of carbonless image transfer products or constructions are those comprising cations having a +2 valence state. Compounds with nickel, zinc, palladium, platinum, copper and cobalt all form such complexes with dithiooxamides. Many of these coordination complexes are deeply colored.

Carbonless imaging constructions, or products employing this chemistry, generally involve placement of one reactant (i.e., one of the transition metal or color-former) on one substrate (for example, sheet of paper) and the other reactant (the one of transition metal or color-former not used on the first substrate) on a second mating substrate. The color-former and metal are maintained separated from contact and reaction with one another. This is typically accomplished by encapsulation of a solution of one of the reactants. Herein, the terms "encapsulation" and "encapsulated compounds" refer to microcapsules enclosing a liquid or a fill material therewithin.

Once rupturing pressure is applied to the construction, as from a stylus or business-machine key, the solution of encapsulated reactant is released, and a complex between the previously separated reactants is formed. In general, the resulting complex will, of course, form a colored image corresponding to the path traveled by the stylus, or the pattern of pressure provided by the key.

In one commercial product, the capsules on a first sheet (donor sheet) contain dithiooxamide (DTO) derivatives, and the mating sheet, sometimes referred to as the receptor sheet, contains a coating of selected salts of nickel. The encapsulated dithiooxamide ligands, in a suitable binder, are coated onto one face of the donor sheet; and, the metal salt, optionally in a suitable binder, is coated onto one face of the receptor sheet. Herein, the term "suitable binder" refers to a material, such as starch or latex, that allows for dispersion of the reactants in a coating on a substrate. In the case of a capsule containing sheet, a suitable binder will allow capsules to be readily ruptured under hand-held stylus pressure, or typical business machine key pressure. When the two coated faces are contacted such that the color-former and the metal salt can combine and react, a coordination complex forms and an image results. Typically, this occurs by transfer of the color-former to the site of the metal salt, i.e., transfer of the color-former from the donor sheet to the receptor sheet. The image, of course, forms on the receptor sheet.

In a preferred orientation, the encapsulated color-formers, in a suitable binder, are coated on the back of the donor sheet, sometimes referred to as a coated back (CB) sheet, and the metal salt, optionally in a suitable binder, is coated on the front of the receptor sheet, or coated front (CF) sheet. Again, in imaging, the two sheets are positioned such that the encapsulated color-formers on the donor (CB) sheet faces the metal salt coating on the receptor (CF) sheet. When pressure is applied to the uncoated surface of the donor sheet, i.e., the face not in contact with the receptor (CF) sheet, selected capsules rupture (i.e., those capsules corresponding to the pattern of applied pressure) with release of the color-former for transfer to the receptor sheet, forming a colored pattern due to complexation with the metal cation. In many applications the uncoated surface of the donor (CB) sheet comprises a form of some type.

The stylus pressure is generated by means of a pen, pencil, or other writing instrument used in filling out the form. Thus, the image appearing on the receptor (CF) sheet is a copy of the image applied to the top sheet.

In another orientation, known as a self-contained carbonless paper, separate CB and CF sheets need not be used at all. In one type of self-contained carbonless sheet, both components may be incorporated within the paper during manufacture. One component, as for example the color-former, is encapsulated and the other component, as for example the developer, is within the paper but outside the capsules. Alternatively, one component (either the color-former or the developer) may be carried in the sheet and the other component (either the developer or the color-former) may be carried as a surface coating on the sheet. Other orientations are known.

In some applications, multiple form-sets have been used. These contain intermediate sheets having a metal salt coating on one side (i.e., the front side) and a coating with encapsulated color-former on the opposite side (i.e., the back side). Such sheets are generally referred to herein as "CFB" sheets (i.e., coated front and back sheets).

Due to the stoichiometry of the system (i.e., the metal salt is usually in excess since relatively little color-former is released and it is usually much less costly than the color-forming microcapsules), it is generally believed that the image formed on the receptor sheet, after stylus pressure is applied to break the capsules and release the color-former, results from the formation of a complex between one molecule of color-former and one atom of nickel having a +2 valence. The counterion of the positively charged transition metal is usually the conjugate base of a weak acid and may facilitate removal of the two protons from the color-former necessary for complexation with the $M^{2+}$ cation. The loss of two protons from the color-former allows it to serve as a ligand with the metal $(M)^{2+}$ cation. The $ligand^{-2}$—/$metal^{2+}$ complex forms the colored image.

In commercial applications, generally, nickel salts have been preferred as the source for the transition metal cation. One reason for this is that $nickel^{2+}$ salts form a deep color when complexed with the dithiooxamide ligands presently employed. The nickel salts are also substantially colorless, and thus do not alone impart color to the receptor (CF) sheet. A third reason is that nickel salts are relatively low in cost, by comparison to other transition metal salts that can be easily and safely handled and that form highly colored coordination complexes with dithiooxamides.

In some applications it is also desirable that the color of the complex be a deep, strong color that is not only pleasing to the eye, but that will exhibit good contrast with the paper for purposes of later reading and/or photocopying. Lack of these attributes has been one drawback with certain conventional carbonless paper arrangements, which use nickel salts complexed with disubstituted dithiooxamide ligands. The image imparted by the resulting coordination compound, under such circumstances, is generally magenta. The more "red" character the polymer complex exhibits, generally, the less contrasting and pleasing is the appearance. A dark, i.e., preferably black, blue, or blue-black, arrangement would be preferred, but previously such has not been satisfactorily obtainable. Recently, an attempt to achieve a blue or blue-black image by employing encapsulated N-(monosubstituted)dithiooxamides compatible with the transition metal chemistry described above was described in copending U.S. patent application Ser. No. 07/438,776, now U.S. Pat. No. 5,124,308. Preparation of these N-(mono-substituted)dithiooxamides is described in applicant's copending U.S. patent application Ser. No. 07/438,765 (now U.S. Pat. No. 5,041,654) incorporated herein by reference. Use of these N-(monosubstituted)dithiooxamides either alone or in admixture with N,N'-(disubstituted)dithiooxamides can result in a cyan, blue, or blue-black image. However, a neutral black image would be most preferred.

One attempt to prepare a neutral black image using transition metal coordination chemistry was disclosed in U.S. Pat. No. 4,334,015. It is disclosed therein that the combination of certain aromatic substituted hydrazones with dithiooxamides followed by encapsulation of the mixture provides a method of achieving a dark image. These hydrazones react with the metal on the receiving sheet to form intense yellow images. The yellow coordination compound thus formed, combined with the blue-purple image formed by the dithiooxamide (such as N,N'-(dibenzyl)dithiooxamide and/or N,N'-di(2-octanoyloxyethyl)dithiooxamide, results in an image that appears almost black to the observer.

Although this is a successful approach, the use of hydrazones disclosed in U.S. Pat. No. 4,334,015 still suffers from several drawbacks. The solubility of the hydrazones is not as great in the solvents generally used in the encapsulation process as are dithiooxamides. In addition, the initial image color of the coordination compounds formed of the mixture of these hydrazones with N,N'-(disubstituted)dithiooxamides is brown and only after some time does the red-black final image color form. Although somewhat more desired in some applications than the blue-purple coordination compound formed with the N,N'-(disubstituted)dithiooxamides alone, this mixture of yellow and blue-purple is a dark red-black rather than the preferred neutral black.

It was also noted in U.S. Pat. No. 4,334,015 that the color of capsules prepared from hydrazone compounds was pH dependent and their color may change from essentially colorless at low pH to yellow at pH greater than 9.5 to 10. It was further noted that this color change is rapid and reversible upon lowering of the pH. Papers can be divided into classes depending upon their methods of manufacture, treatment and sizing. Among these classifications are acidic and alkaline papers. More and more "alkaline paper" is being produced since it is considered to be long lasting and to have "archival" qualifies. Encapsulated hydrazones, when coated onto "alkaline paper" can form yellow colors, which on white paper and on some colored papers is undesirable.

The color-forming ligands generally useful in carbonless paper constructions should also be relatively nonvolatile, so that free color-former, which would result from any inadvertently ruptured capsule, does not readily transfer from the donor sheet to the receptor sheet and form undesired spots of imaged area. That is, so that without the specific assistance of stylus or key pressure, transfer is not readily obtained.

In conventional impact imaging constructions, the capsules can be inadvertently ruptured in steps such as processing, printing, cutting, packaging, handling, storing, and copying. In these situations inadvertent marking or discoloration (i.e., backgrounding) of the sheets results due to inadvertent capsule rupture and transfer of the encapsulated material to the mating sheet where color formation occurs. The amount of inadvertent backgrounding has been reduced in such products by the use of a color control coreactant distributed externally among the capsules. This coreactant is capable of reacting with the contents of the ruptured capsules before transfer of such contents to the receptor sheet and formation of an undesired image. See U.S. Pat. No. 3,481,759 which discloses that addition of a small amount of a metal salt such as a zinc salt to the dithiooxamide compound containing capsule coating prevents the formation of colored background. The zinc metal ion reacts with the dithiooxamide released adventitiously to form colorless coordination compounds.

The use of the invention disclosed in U.S. Pat. No. 4,334,015 in combination with that of U.S. Pat. No. 3,481,759 is not possible as zinc forms yellow coordination complexes with the hydrazones of the invention of U.S. Pat. No. 4,334,015. Thus, yellow color backgrounding still occurs on the backside of the sheet due to inadvertently ruptured capsules. It would be desirable to have a yellow color-former that could be successfully deactivated by the same method as that disclosed in U.S. Pat. No. 3,481,759. Then, the same method of deactivation of the yellow, magenta, and cyan color-formers released by inadvertent capsule rupture would be possible.

Another approach to formation of a black image employs an encapsulated mixture of an acid sensitive green-foraging leuco dye and a dithiooxamide color-former. The receptor sheet is formulated to contain phenolic type acids in addition to the transition metal salts. In this system, pressure imaging results in the release of both acid sensitive leuco dyes and dithiooxamide materials. The nickel salt in the receptor sheet reacts with the dithiooxamide to form a purple color and the phenolic acid in the receptor sheet reacts with the acid-sensitive leuco to form a green color. Together they generate a black image. This approach, while successful, has several disadvantages. Heavy coatings to the papers are required as two separate chemistries are involved. Another drawback of this approach is that the rates of reaction for the two chemistries are different and which results in images developing initially with a definite green or blue hue before turning black.

It is preferred that the color-former should be colorless, since the color-former is often encapsulated and coated onto the backside of a sheet, such as a form, which has printing on one or both sides thereof. This aspect is particularly important if the donor sheet comprises a top sheet for a stack of carbonless papers. Such sheets are often white, so that they can be readily identified as originals, can be readily photocopied, and can be easily read.

While the above-described preferred characteristics have long been desirable, they have not been wholly satisfactorily achieved with conventional reactants and conventional constructions. Suitable materials and arrangements for achieving the desired features described have been needed.

SUMMARY OF THE INVENTION

In part, certain embodiments of the present invention are the result of finding that certain organic compounds are colorless and form yellow complexes upon coordination with certain transition metal cations such as nickel$^{2+}$. It has been found that when such color-formers are employed in applications such as image transfer constructions (i.e., carbonless paper), a yellow image is produced. It has also been found that when such color-formers are mixed with other compounds capable of forming magenta and cyan colored complexes, a black complex can form upon coordination of this mixture with transition metals.

It is one object of this invention to provide color-forming compositions useful in encapsulated imaging systems wherein the color is formed by formation of a complex between a transition metal cation and a yellow color-former.

The aromatic substituted color-forming compounds found to be useful in the present invention and capable of forming colored complexes with transition metal salts can be represented by the following formula:

$$Ar—CH=N—R \qquad I$$

wherein Ar is aryl and preferably is selected from the group of aromatic substituents comprising phenyl, substituted phenyl, naphthyl, and substituted naphthyl bearing a hydroxyl group adjacent (i.e., ortho) or pseudo-adjacent (i.e., peri) to the site of attachment of the linking carbon atom attached to the nitrogen atom; and R is selected from the group consisting of:

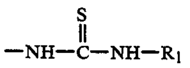

(i)

wherein $R_1$ is a substituent comprising hydrogen, alkyl, cycloalkyl, and aryl (preferably phenyl, substituted phenyl, naphthyl, substituted naphthyl);

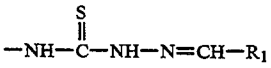

(ii)

wherein $R_1$ is as defined above; and

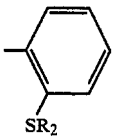

(iii)

wherein $R_2$ is selected from the group of substituents comprising hydrogen, alkyl, cycloalkyl, branched alkyl, substituted alkyl, and heteroalkyl (e.g., alkylethers, alkylamides, alkylesters and disulfides.

It is another object of this invention to provide yellow color-formers useful as imaging compositions wherein a mixture of color-formers is employed and the color is formed by the formation of a complex between a transition metal cation and the mixture of color-formers.

It is another object of this invention to demonstrate that yellow color-forming compounds of the type described above can be encapsulated and utilized to form carbonless copy papers that provide strong yellow images. When a mixture of color-formers is encapsulated, images of varying colors can be formed by the formation of a complex between a transition metal cation and the encapsulated color-formers. In particular, when mixed with cyan and magenta color-formers, black images are formed upon imaging.

It is a further object of this invention to show that the above-identified representative compounds satisfy the requirements of solubility in suitable solvents for encapsulation, nonsolubility in aqueous media, non-reactivity with fill solvents and color-formers mixed therewith, compatibility with existing transition metal/dithiooxamide imaging systems, and low volatility at room temperature, i.e., about 25° C. In addition, they are generally colorless or lightly colored color-formers and impart little or no color to the sheets upon which they are coated in use. Finally, they form generally yellow colors on coordination with at least some transition metal ions, such as nickel.

The most preferred compounds satisfy all the above requirements, plus they are generally nonvolatile at elevated temperatures, i.e., above about 25° C., most preferably above about 49° C. The most preferred compounds include: 1,5-bis[(o-hydroxyaryl)methylene]thiocarbohydrazones, such as, for example, 1,5-bis(-salicylidene)-3-thiocarbohydrazone and substituted versions thereof.

The invention further includes within its scope the provision of a carbonless transfer system or construction utilizing material according to formula I above, as a reactant. In a preferred embodiment, the construction comprises: a donor sheet having encapsulated color-former according to formula I thereon; and, a receptor sheet having a coating of transition metal salt, preferably a $Ni^{2+}$ salt, thereon. The encapsulation provides means inhibiting any reaction between the color-former and the transition metal cation until appropriate activating pressure is applied to the arrangement.

It will be understood that in some instances the encapsulated color-formers may comprise, in addition to the yellow color-former of formula I, a mixture of an N-(monosubstituted)dithiooxamide (capable of forming blue or cyan image on coordination) and an N,N'-(disubstituted)dithiooxamide (capable of forming magenta or purple color). Should this latter be the case, a generally dark overall color would result upon image formation, provided, however, that an effective amount (i.e., an amount effective to produce a dark black image rather than a yellow image) of dithiooxamide color-formers were also present.

It will also be understood that in some instances the carbonless transfer system may comprise a mixture of capsules each containing separate encapsulated color-former solutions. In this instance, color would be formed by the mixing of the color-former solutions upon capsule rapture and reaction with the metal cation. Again, the use of a mixture of capsules each individually containing yellow, magenta or cyan color-former would result in a black color upon image formation, provided, however, that an effective amount (i.e., an amount effective to produce a dark black image rather than a yellow image) of dithiooxamide color-formers were also present.

The invention also includes within its scope a method of forming an image on a receptor sheet comprising: providing a receptor sheet having a surface with a transition metal salt coated thereon; and, transferring to the coated surface of the receptor sheet an effective amount of a compound of structure I. The compound can be volatile or nonvolatile; however, in preferred applications, it will be a non-volatile compound according to formula I.

DETAILED DESCRIPTION OF THE INVENTION

The Yellow Color-former

Figure 1:
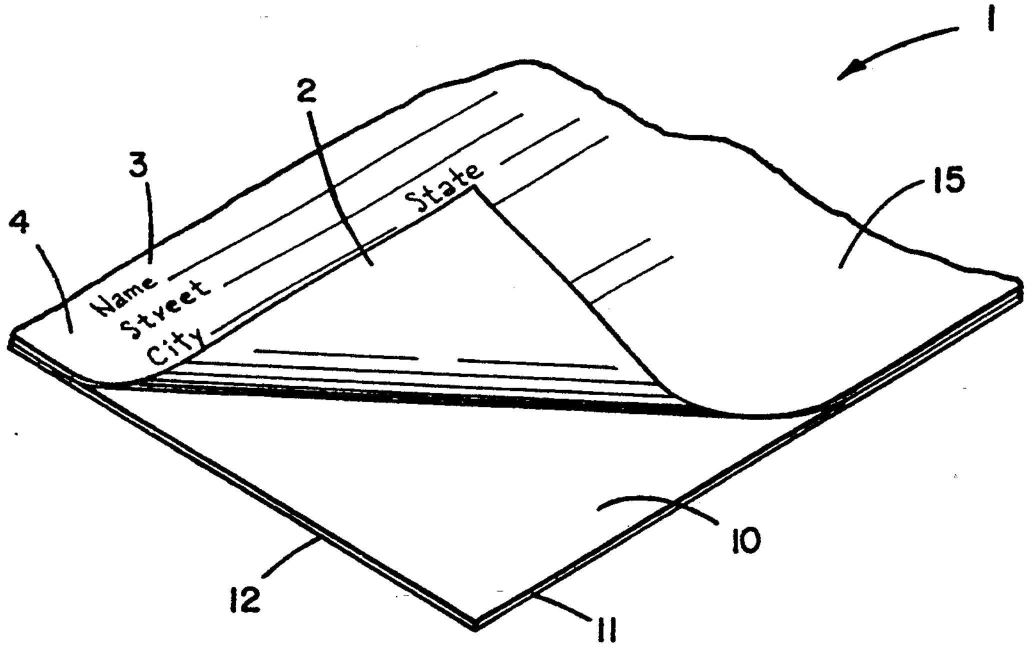
FIG. 1 is a fragmentary perspective view of a carbonless paper construction according to the present invention, depicted with first and second substrates thereof partially separated.

As mentioned above, in order to be useful in an encapsulated imaging system, the color-former must satisfy several requirements. It must be encapsulable and therefore not be soluble in water. It must have low volatility so that the free color-former resulting from inadvertently ruptured capsules does not transfer from the CB to the adjacent CF sheet and form spots of imaged area. It must have low coloration in the uncomplexed state and it must form a stable colored image upon contact with the metal from the CF sheet.

The encapsulation process requires the color-former be dissolved in a solvent or mixed solvents, because of the nature of the procedure. For example, in one type of encapsulation process, known as in-situ polymerization, condensation of urea or melamine with formaldehyde to form the capsule shell is carried out in an acidic aqueous medium and the color-former solution must be insoluble and unreactive to these reagents for the encapsulation to proceed. Solvents commonly used include tributyl phosphate, diethyl phthalate, and cyclohexane. It is obvious that the imaging sheet production depends upon success in this encapsulation and hence upon having suitable solubility of the color-former in the solvents. Solubility of yellow color-formers exemplified by structure I in nonaqueous solvents such as those used in the encapsulation process may be increased by substituting alkyl, aryl, aralkyl, or such groups for the hydrogens on the various positions available in the structure I above. Representative compounds of structure I are shown in Table 5 below.

Compounds according to formula I as defined are generally insoluble in aqueous solution, soluble in aqueous-immiscible solvents in a pH range of about 1 to 9, and thus are readily encapsulable. Such aqueous-immiscible solvents include xylene, toluene, cyclohexane, diethyl phthalate, tributyl phosphate, and the like. Compounds included within the scope of formula I as defined also generally readily form yellow images upon coordination with at least certain transition metal salts, and most preferably nickel salts.

It is an important feature of the present invention that the liquid employed as the solvent for the encapsulated reactant be a solvent for the coreactant (such as the metal salt) as well, whether the latter is also encapsulated or not. This same solvent then serves as a reaction implementing medium for the two reactants at the time of rupture of the capsules and is commonly referred to as a cosolvent. Examples of cosolvents which fulfill the above mentioned criteria are cyclohexane, tributyl phosphate, diethyl phthalate, toluene, xylenes, 3-heptanone, and the like. The selection of additional suitable cosolvents will be obvious to those skilled in the art.

It is another feature of this invention that the yellow color-formers are compatible with metal/dithiooxamide imaging chemistry. They are soluble in the same encapsulation solvents as the dithiooxamides. They also do not react with either the dithiooxamides or the encapsulation solvent. This allows one "imaging chemistry", i.e., the formation of coordination compounds, to be used.

When compared with the yellow color-formers described above in U.S. Pat. No. 4,334,015, the yellow color-formers of the present invention, represented by structure I form relatively colorless complexes with $Zn^{2+}$ salts. This is demonstrated in Table 2. Many of the color-formers of this invention give colorless to pale yellow colors on the $Zn^{2+}$ containing CB sheet, and afford yellow colors on the $Ni^{2+}$ containing CF sheet. In contrast, the preferred color-formers of U.S. Pat. No. 4,334,015 give yellow colors on both the $Zn^{2+}$ containing CB sheet as well as the $Ni^{2+}$ containing CF sheet (see Table 2 Ref. #20 and Ref. #21). Thus, the use of the color-formers of the present invention in combination with the color control coreactants taught in U.S. Pat. No. 3,481,759 is now possible and the same method of deactivation of the yellow, magenta, and cyan color-formers released by inadvertent capsule rupture can now be used.

The yellow color-formers of the present invention [thiosemicarbazones, thiocarbohydrazones, and 2-alkylthio-N-[(2-hydroxyaryl)methylene]aniline imines] are more soluble in the solvents generally used in the encapsulation process. If necessary, increased solubility in the encapsulation solvents can be obtained by incorporating onto the 2-hydroxyaryl moiety such substitutents as allyl, alkyl, and particularly alkyl groups such as iso-propyl, or t-butyl. If necessary, several such groups may be incorporated onto the ring to achieve the desired solubility. It is also envisaged that subtle color variations can be obtained by incorporation of one or more non-conjugative auxochromes onto the rings. Such auxochromes include, but are not limited to hydroxy, alkoxy, halogen such as fluoro, chloro, bromo, and iodo, or combinations thereof. The only limitation is that the substituents do not render the color-former precolored in the uncomplexed state or insoluble in the solvents used in the encapsulation process. In addition the color-formers of the present invention are less sensitive to color change upon adjustment of pH and maintain their essentially colorless nature when encapsulated and coated onto "alkaline paper."

Those compounds that are relatively nonvolatile at temperatures of at least about 49° C., and preferably up to at least about 71° C., are particularly useful in the embodiments of the invention. The term nonvolatile when used according to the present invention, is meant to refer to compounds that pass the volatility test outlined herein below. That is, the compounds are classifiable as nonvolatile under the conditions of the test.

The ease of preparation of the compounds exemplified by structure I is a further consideration to the commercial exploitation of this invention. The above-listed compounds, and related compounds according to the general formula I, are readily obtainable through synthetic methods known in the literature and further described herein.

In a typical application, to generate an image on a substrate, the complex is formed by contacting the color-former (or a solution containing the color-former) with a substrate having a coating of transition metal salt thereon. The preferred transition metal salts are those of nickel; however, salts of copper, iron, and other transition metals may, in certain applications, be used within the scope of this invention. Examples of transition metal salts for this application are nickel 2-ethylhexanoate, nickel rosinate, nickel stearate, nickel benzoate, nickel 2-phenylbutyrate, nickel oleate, nickel hydro-cinnamate, nickel calcium rosinate, and the like (see U.S. Pat. No. 4,111,462). Preferred transition metal salts for use in this invention are nickel rosinate, nickel 2-hexanoate, and mixtures thereof. Again, formation of the complex is evidenced by appearance of a strong yellow color shortly after the imaging impact takes place.

As shown in Table 3, when the color-formers of the present invention are used in admixture with certain dithiooxamide compounds various colors can be formed. For example, a mixture of yellow color-former of this invention with a magenta color-former such as an N,N'-(disubstituted)dithiooxamide affords a red color upon imaging. This mixture could be used in the preparation of carbonless copies of airline tickets. The images on such copies are usually red. Similarly, a mixture of yellow color-former of this invention with a cyan color-former such as an N-(monosubstituted)dithiooxamide would afford a green image. When a yellow color-former of this invention is mixed with an effective amount of an N-(monosubstituted)dithiooxamide which provides a cyan image, and an N,N'-(disubstituted)dithiooxamide which provides a magenta image; or mixtures thereof which provide a dark blue to blue-black image; the resulting complex composition appears black to the observer.

It is noted that complexes formed with the yellow color-formers of the present invention are relatively stable.

Carbonless Imaging Constructions

The invention further includes within its scope image transfer systems or constructions, i.e., carbonless impact marking papers for the transfer of images. In general, this involves coating one reactant (the color-former) on one substrate, and the transition metal salt (the other reactant) on another, mating, substrate. Means for preventing reaction of the two until intended, i.e., until activating pressure is applied, are also provided. Preferably, the color-forming compounds are contained or encapsulated in microcapsules on one sheet of paper. The reactant for the color-forming compound, i.e., the transition metal salt, is carried on a mating sheet of paper. The microcapsules serve the purpose of isolating the reactants from one another (i.e., preventing reaction) until such time as pressure is applied to the paper for the purpose of creating an image.

Generally, a carbonless paper construction comprises at least two substrates, for example two sheets of paper, each with one surface, or side, coated with one of the two primary reactants. The two substrates are generally referred to as a donor sheet and a receptor sheet. When the coated faces, or surfaces, of the two substrates come into contact under sufficient pressure so that the reactants can mix, a reaction occurs and an image forms on the receptor sheet.

A preferred construction 1 (FIG. 1) comprises the encapsulated color-former dissolved in an appropriate solvent(s) within microcapsules and coated onto a back side 2 of a donor sheet 3 in a suitable binder. The back side 2 of donor sheet 3 is sometimes referred to herein as a coated back (CB) sheet 4. The metal salt, preferably a $Ni^{2+}$ salt, optionally in a suitable binder, is coated onto a front side 10 of a mating, or receptor, sheet 11, herein sometimes referred to as a coated front (CF) sheet 12. As stated previously, in imaging, the two sheets are positioned such that the back side 2 of donor sheet 3 faces the metal salt coating on the front side 10 of the receptor sheet 11 as shown in FIG. 1. When activating pressure is applied to face 15 of the donor sheet 3, the capsules rupture and release the color-former for transfer to the receptor sheet 11, forming a colored pattern due to complexing with the salt. It is noted that in FIG. 1 the coated back (CB) sheet 4 and the coated front (CF) sheet 12 are shown partially separated to facilitate understanding of the invention. Herein, "activating pressure" includes, but is not limited to, pressure applied by hand with a stylus or pressure applied by a business machine key, for example a typewriter key.

Also included within the scope of the invention is a construction comprising a first substrate surface, on which is coated the encapsulated color-former, and, a second substrate surface, on which is coated a salt of a transition metal cation with a +2 oxidation state. The coated first substrate surface is positioned within the construction in contact with the coated second substrate surfaces. Such a construction is known as a "form-set" construction. Form-sets, prepared by collating several sheets are common in the carbonless paper industry.

Substrates, with one surface on which is coated the encapsulated color-former, and a second, opposite, surface on which is coated a salt of a transition metal cation (as for example $Ni^{2+}$) can be placed between the CF and CB sheets, in a construction involving a plurality of substrates. Such a sheet is sometimes referred to as a CFB sheet. Of course, each side including color-former thereon should be placed in juxtaposition with a sheet having metal salt thereon. CFB sheets are typically used in form-sets.

Also included within the scope of the invention are pads or tablets or form-sets. These are often prepared by collating a plurality of CB sheets; and a plurality of CF sheets. CFB sheets, may be optionally included. Pads or tablets of form-sets are then formed by edge-padding or gluing the edges of a stack of form-sets.

The color-forming compounds and compositions of the present invention can be used in the manner that DTO based chemistries have previously been used. Indeed, one advantage of the yellow color-formers of the present invention is their ability to image using the same transition metal coordination chemistry employed in dithiooxamide based imaging systems. For example, pressure sensitive carbonless transfer and record sheets which are capable of providing colored images can be provided by encapsulating the yellow color-forming compounds of the present invention and a cosolvent vehicle in substantially impermeable, pressure-rupturable microcapsules and applying these encapsulated materials to paper substrates. Alternatively, a composition comprising the yellow color-forming compounds of the present invention in a cosolvent vehicle can be carried by a variety of materials such as woven, non-woven or film transfer ribbons for use in impact marking systems such as typewriters and the like, whereby the yellow color-former is transferred to a record surface containing a transition metal salt by impact transfer means. Further, a composition comprising the yellow color-former and a cosolvent vehicle could be absorbed in a porous pad for subsequent transfer to a coreactive record surface by transfer means such as a portion of the human body, e.g a finger, palm, foot or toe, for providing fingerprints or the like.

Preparation of Substrate (Donor Sheet) Coated with Encapsulated Yellow Color-former A carbonless copy construction comprises a substrate containing microcapsules filled with a compound of formula I dissolved in a suitable fill solvent or solvents, the solution of which is water-insoluble. Preferably, the shell of the capsules are of a water-insoluble urea-formaldehyde product formed by acid-catalyzed polymerization of a urea-formaldehyde precondensate; see U.S. Pat. No. 3,516,846 (1970).

A capsule slurry, as prepared from a mixture of the urea-formaldehyde precondensate and a fill material containing yellow color-formers of structure I, is combined with a binding agent, such as aqueous sodium alginate, starch, or latex, for coating on one face of a substrate. In the preferred embodiment, the back of the donor sheet is coated with the capsule slurry, and is referred to as the coated back (CB) sheet.

Preparation of Substrate (Receptor Sheet) Coated with Metal Salt

The receptor sheet with the transition metal salt coated thereon (also known as the developer sheet) comprises the transition metal salts of organic or inorganic acids. The preferred transition metal salts are those of nickel, although copper, iron, and other transition metals may be used to advantage in some applications.

Inorganic acids that can be used to react with the transition metals to form the transition metal salts are acids whose anions form salts with transition metals and that will dissociate from the transition metal in the presence of the color-former for the color-forming reaction. Typical inorganic acids are nitric acid and sulfuric acid, which form nickel nitrate and nickel sulfate, respectively.

Organic acids that are useful in forming the transition metal salts, and that readily dissociate in the presence of color-formers, are the aliphatic and aromatic mono- and di- carboxylic acids, substituted aliphatic and aromatic monocarboxylic acids, and heterocyclic monocarboxylic acids. 2-Ethylhexanoic acid, and abietic acid (rosin acid) and its hydrogenated forms, are particularly preferred acids. Nickel 2-ethylhexanoate and nickel rosinate are two particularly preferred transition metal salt developers. Other representative transition metal salts are the nickel, iron, and copper salts of the described organic acids. Examples of such are nickel rosinate, nickel calcium rosinate, nickel stearate, nickel 2-phenylbutyrate, nickel oleate, nickel benzoate, and nickel hydro-cinnamate, as well as the copper and iron analogues. Also, included within the scope of the invention are mixtures of these compounds.

The composition including the transition metal salt may be coated on substrates by conventional coating techniques. The transition metal salt is preferably coated on the front side of a substrate, such as a sheet of paper which is referred to as the coated front (CF) sheet. Additionally, the transition metal salt may be formulated into printing compositions and be printed onto all or a portion of a substrate, such as paper. See, for example, U.S. Pat. No. 4,111,462 described above.

Evaluation of Volatility

The preferred compounds of present invention exhibit a preferred volatility level, and are most favored for use in carbonless imaging transfer systems such as the preferred ones described above, in which selected formation of a yellow image is desired. The method utilized in the experiments to both define and evaluate the level of volatility was as follows. A piece of Grade #10 (20×12) cheesecloth was placed between a simulated donor sheet and a receptor sheet of a carbonless paper construction. The simulated donor sheet comprised a sheet of paper saturated with color-former of structure I, which was used to simulate a CB sheet with ruptured capsules. Pressure was then applied for 24 hours by placing 9 pounds of paper on top of the sheets, to simulate storage conditions of the paper packages. The formation of color on the receptor sheet, due to transfer of volatile color-former thereto, was used as an indication that the particular color-former was less than optimally desirable for carbonless paper constructions, i.e., was volatile. A compound was considered generally to be nonvolatile, within the meaning of the term as used herein to define the present invention and thus to define color-formers most acceptable for use in carbonless image transfer arrangements, if no color was formed after the simulated test was run for about 24 hours at 25° C. In some instances, if no color was formed after storage at room temperature (25° C.), successively higher temperatures were used, as for example 49° C., 60° C., and 71° C. This will be better understood by reference to Experiment 5 below. In general, the most preferred compounds, with respect to volatility, are those which do not substantially generate color appearance under the conditions of the test, even at the higher temperatures.

Determination of Complex Color

In general, the colors of the complexes were determined by preparing a solution of the yellow color-former and appropriate solvent, and then applying the solution to a substrate coated with a $Ni^{+2}$ salt, by means of an application swab. Rapid and complete development of the image was enhanced by passing the sheet through a hot shoe adjusted to 102° C. Visually observed colors were recorded.

One method of color measurement is to determine the color's position in color space. One color space system is the Hunter System; see F. W. Billmeyer, Jr., and M. Saltzman, *Principles of Color Technology*; John Wiley & Sons; New York, N.Y.; Ch. 2 & 3, 1981. In this system three mutually perpendicular axes (L, a, and b) are needed to define a color. "L" (+z axis) represents the lightness/darkness; "a" (x axis) represents the amount of red or green (+a is red, −a is green); and "b" (y axis) represents the amount of yellow or blue (+b is yellow, −b is blue). A neutral or black color in this system would have values of about a=0 and b=0. By measuring a material's L, a, and b values, the color of one sample can be compared with that of other samples. Because the color of a sample is also dependent upon the color temperature of the illuminating source, the angle at which the sample is illuminated, the angle at which the illumination is reflected, and the angle of the retina illuminated, these all need to be specified. Many instruments have been developed to record these values. One such instrument is the HunterLab LabScan II. This instrument is capable of automatically determining the L, a, and b values for a given sample, and was used for the following examples.

The present invention will be further described by reference to the following detailed examples.

EXPERIMENTAL EXAMPLES

As the following experiments show, according to the present invention, there is defined a class of color-formers defined by structure I useable in the formation of a yellow complex upon association with a transition metal cation. The complex is not only of the preferred color, but also the class of compounds according to the invention is relatively nonvolatile and thus readily useable in products for which a yellow component of the image is preferred, such as carbonless paper constructions.

EXPERIMENT 1

Preparation of Thiosemicarbazones

Preparation of 1-salicylaldehyde-4-phenyl-3-thiosemicarbazone.

Into a 3 liter 3-necked flask, equipped with reflux condenser, rotary stirrer, and heating mantle, were placed 320 g (1.91 mol) of 4-phenyl-3-thiosemicarbazide, 2.5 liters of ethanol, and 234 g (1.91 mol) of salicylaldehyde. Stirring was begun and the solution heated at reflux overnight. As the reaction progressed, a precipitate developed and the reaction mixture thickened. The reaction was monitored by TLC and upon completion, the mixture was allowed to cool. The crystals were filtered off, washed with ethanol, hexanes, and allowed to dry in air. The yield was 480 g (93%) of 1-salicylaldehyde-4-phenyl-3-thiosemicarbazone; mp 181°-182° C.

1-(3,5-dibromosalicylaldehyde)-3-thiosemicarbazone and 1-(3-ethoxysalicylaldehyde)-4-cyclohexyl-3-thiosemicarbazone were purchased from the Aldrich ABC Library of Rare Chemicals.

In a manner similar to that described above, the following thiosemicarbazones were prepared.

1-salicylaldehyde-3-thiosemicarbazone was prepared from salicylaldehyde and thiosemicarbazide (77% yield).

1-(2-hydroxynaphthaldehyde)-4-phenyl-3-thiosemicarbazone was prepared from 2-hydroxy-1-naphthaldehyde and 4-phenyl-3-thiosemicarbazide (84% yield).

EXPERIMENT 2

Preparation of Thiocarbohydrazones

Preparation of 1,5-bis(salicylaldehyde)-3-thiocarbohydrazone

Into a 3-liter autoclave were placed 50 g (0.47 mol) of thiocarbohydrazide, 115 g (0.94 mol) of salicylaldehyde, and 1.75 Kg of ethanol. The vessel was sealed and the reaction heated at 80° C. for 15 hr. Upon cooling, the suspension was filtered and the crude product washed with ethanol and dried in air to afford 1,5-bis(-salicylaldehyde)-3-thiocarbohydrazone in 93% yield.

Preparation of 1,5-bis(3,5-di-t-butylsalicylaldehyde)-3-thiocarbohydrazone

This compound was prepared from thiocarbohydrazide and 3,5-di-tert-butylsalicylaldehyde in a manner analogous to that described above. The 3,5-di-tert-butylsalicylaldehyde was prepared as described by Casnati [see G. Casnati, et al., U.S. Pat. No. 4,151,201 (1979)]

Preparation of 1,5-bis(4-methoxysalicylaldehyde)-3-thiocarbohydrazone

This compound was prepared from thiocarbohydrazide and 2-hydroxy-4-methoxybenzaldehyde (4-methoxysalicylaldehyde) in a manner analogous to that described above. The 2-hydroxy-4-methoxybenzaldehyde was purchased from Aldrich Chemical Company, Milwaukee, Wis. 53233.

EXPERIMENT 3

Preparation of 2-alkylthio-N-[(2-hydroxyaryl)methylene]aniline imines

Preparation of 2-(Dodecylthio)aniline

Into a 2-liter 3-necked round bottomed flask equipped with condenser, stirrer and heating mantle, were placed 125.0 g (1.0 mol) of 2-aminothiophenol, 350 ml of ethanol and 40 g (1.0 mol) of sodium hydroxide dissolved in 40 ml of water. Stirring was begun and after 15 min, 249.24 g (1.0 mol) of 1-bromododecane was added. Heating was begun and the solution heated at reflux overnight. Upon cooling, solvent was removed at reduced pressure and water (500ml) and dichloromethane (500 ml) were added. The mixture was transferred to a 2-liter separatory funnel and the layers separated. The aqueous layer was discarded, the organic layer washed with 500 ml of aqueous sodium chloride solution and dried over anhydrous magnesium sulfate. The crude material was passed through a bed of silica, solvent was removed at reduced pressure, and the material distilled under vacuum to afford 220 g (75%) of 2-(dodecylthio)aniline (b.p. 180° C. at 0.25 mm).

In a manner similar to that described above, the following 2-(alkylthio)anilines were prepared.

2-(n-butylthio)aniline
2-(n-octylthio)aniline
2-(n-decylthio)aniline
2-(benzylthio)aniline
2-(amino)thiophenol and 2-(methylthio)aniline were purchased from Aldrich Chemical Company.

Preparation of 2-dodecylthio-N-(salicylidene)aniline

Into a 1-liter flask equipped with condenser, stirrer and thermometer, were placed 220 g (0.75 mol of 2-(dodecylthio)aniline, 200 g of ethanol, and 91.5 g (0.75 mol) of salicylaldehyde. The resultant solution was heated at reflux overnight. Upon cooling, solvent was removed at reduced pressure to afford 290 g (97%) of product as a dark yellow/brown oil.

In a manner similar to that described above, the following imines were prepared.

2-mercapto-N-(salicylidene)aniline
2-methylthio-N-(salicylidene)aniline
2-butylthio-N-(salicylidene)aniline
2-octylthio-N-(salicylidene)aniline
2-decylthio-N-(salicylidene)aniline
2-benzylthio-N-(salicylidene)aniline
2-mercapto-N-[(2-hydroxy-1-naphthyl)methylene]aniline
2-decylthio-N-[(2-hydroxy-1-naphthyl)methylene]aniline

EXPERIMENT 4

Encapsulation of the Color-formers and Preparation of the CB Sheet

A precondensate solution was prepared comprising 191.88 g of formalin, 0.63 g of potassium tetraborate, 71.85 g of urea, and, 327.93 g of soft water. The formalin was 37% formaldehyde, and was added to a 1-liter flask equipped with a stirrer and heating mantle. The potassium tetraborate and urea were then added, and the mixture was heated to 70° C. The reaction was maintained at that temperature for 2.5–3.0 hours. The reaction mixture was then diluted with the water and allowed to cool. The precondensate solution, with about 24% solids, was then ready for use in the encapsulation process.

The precondensate and fill (compound of structure I and carder or fill solvents) were combined to make capsules according to the following procedure. Sodium chloride (29.54 g) was added to the stirred precondensate solution and the temperature of the solution was adjusted to 20° C. The fill material (214.17 g) was added and full agitation was begun. After 5 minutes of stirring, 10% hydrochloric acid solution was added over 5 minutes in an amount such that the final pH of the reaction mixture was about 2.8. The reaction mixture was stirred for another 12 minutes. More of the 10% hydrochloric acid solution was added over a period of 12 minutes, in an amount such that the final pH of the solution was about 1.8. The reaction mixture was stirred at 20° C. for 1 hour, and then at 60° C. for 1–3 hours. The acidic solution was allowed to cool and adjusted to a pH of 7 by addition of concentrated ammonium hydroxide solution (28%). The capsule slurry could then be stored for later use.

The capsule slurry (10 g) was added to 65 g of a 1.5% aqueous sodium alginate solution. The mixture was applied to a coated paper using a bar coater with a 3 mil gap. The coating was allowed to dry at room temperature.

EXPERIMENT 5

Determination of the Volatility of Color-forming Derivatives

The volatilities of the color-formers of the present invention derivatives were determined by preparing a 1% solution, by weight, of each thiocarbohydrazone, thiosemicarbazone, or 2-alkylthio-N-[(2-hydroxyaryl)-methylene]aniline (prepared as described above) in acetone. Each solution was applied to bond paper (16 pound) with a cotton swab to saturate an area approximately 3 cm by 10 cm, and the acetone was allowed to evaporate by air drying for about 30 minutes. This treated paper, a simulated donor sheet, was then covered with a single layer of Grade #10 (20×12) cheesecloth (AF&F Item No. 588033, American Fiber and Finishing, Inc., Burlington, Mass.) and a receptor sheet was placed receptor side down on top of the cheesecloth. The receptor sheet was a white CF sheet manufactured by the Carbonless Products Department of 3M Company, St. Paul, Minn. Two reams of paper (9 pounds) were placed on the sheets to maintain intimate contact. After a selected time (approximately 24 hours) at room temperature, the CF sheet was removed and visually inspected for coloration. The results using this procedure are listed in Table 1. A similar test was conducted at elevated temperatures for several of the materials that were found to be nonvolatile at room temperature. The results of this analysis also appear in Table 1. In these tables: "volatile" indicates that colored image was readily perceptible; "slightly volatile" indicates that colored image was barely perceptible, i.e., faint; and, "nonvolatile" indicates that there was no detectable colored image.

EXPERIMENT 6

Determination of Complex Colors

The colors of the complexes, as listed in Tables 2 and 3, were determined by preparing a solution of the indicated concentration of each color-former in a solvent composed of a mixture of tributyl phosphate (26.5%), diethyl phthalate (17.6%), and cyclohexane (55.9%). The images were formed by applying two stripes of the color-former (or mixture of color-formers) solution to a Ni(II) coated receptor sheet using a cotton tipped applicator swab. Rapid and complete development of the image was achieved by passing the sheet through a hot shoe adjusted to 102° C., making a revolution every 10 seconds. The visually observed colors were recorded. The L, a, and b color coordinates of the more uniform stripe were measured on a HunterLab LabScan II, with 0°/45° geometry, 2° observer, using illuminant C. The observed (image) color and the Hunter coordinates for Ni(II) complexes of the yellow color-formers of this invention are given in Table 2.

The observed (image) color and the Hunter coordinates of mixtures of the yellow color-formers of this invention with N-(monosubstituted)dithiooxamides and N,N'-(disubstituted)dithiooxamides are given in Table 3. The following magenta and cyan color-formers were used in admixture with the yellow color-formers of this invention.

Magenta Color-formers

A N,N'-di(2-octanoyloxyethyl)dithiooxamide
B N,N'-di(dodecyl)dithiooxamide
C N,N'-di(2-decanoyloxyethyl)dithiooxamide
D N,N'-di(2-dodecanoyloxyethyl)dithiooxamide
E N,N'-di(2-octanoylamidoethyl)dithiooxamide
F N,N'-di(6-propanoylamidohexyl)dithiooxamide
G N,N'-di(5-octanoylamido-2-methylpentyl)dithiooxamide mixed with
N-(5-octanoylamido-2-methylpentyl)-N'-(5-octanoylamido-4-methylpentyl)dithiooxamide and
N,N'-di(5-octanolyamido-4-methylpentyl)dithiooxamide
H N,N'-di(benzyl)dithiooxamide
I N,N'-di(benzoyloxyethyl)dithiooxamide Cyan Colorformers A' N-(2-octanoyloxyethyl)dithiooxamide
B' N-dodecyldithiooxamide
C' N-(2-decanoyloxyethyl)dithiooxamide
D' N-(2-dodecanoyloxyethyl)dithiooxamide
E' N-(2-octanoylamidoethyl)dithiooxamide
F' N-(6-propanoylamidohexyl)dithiooxamide
G' N-(5-octanoylamido-2-methylpentyl)dithiooxamide mixed with
N-(5-octanolyamido-4-methylpentyl)dithiooxamide

EXPERIMENT 7

Encapsulation of Black Image Formulations

A mixture of 44% by weight of compound 14, 19% N,N'-di(octanoyloxyethyl)dithiooxamide (A), and 37% N-dodecyldithiooxamide (B') was dissolved at an 11.5% solids level in the capsule solvent blend of diethyl phthalate, tributyl phosphate, and cyclohexane. The solution was encapsulated and coated to form a CB sheet as described in Experiment 4. The coated CB sheet was neutral in color. When imaged with a CF sheet, the image appeared a neutral black and had Hunter coordinates of:

L=52.7
a=1.2
b=−3.9

The L value indicates the image is dark and has good contrast on a light background. The values for a and b indicate the image is very close to a neutral (black) color.

In a manner similar to that described above, capsules were prepared containing mixtures of the yellow color-formers of this invention with N-(monosubstituted)dithiooxamides and N,N'-(disubstituted)dithiooxamides. The observed (image) color and the Hunter coordinates are given in Table 4. The example above is also included for comparison.

EXPERIMENT 8

Formation of Dark Images by lending of Capsules

A 5% solution of compound 16 in the capsule fill solvent of diethyl phthalate, tributyl phosphate, and cyclohexane was encapsulated by the procedure described in Experiment 4 above. A coating mixture of 10.0 g of capsule slurry, 2.5 g of Dow 620 styrene-butadiene latex, and 62.5 g of 1.5% sodium alginate solution was coated onto paper by the draw down procedure also described in Experiment 4. The coated CB sheet was neutral in color. When imaged with a CF sheet coated with a nickel$^{2+}$ salt an image was formed with Hunter coordinates of:

L=86.8
a=9.1
b=31.7

The values for a and b indicate the image to be greenish-yellow in color.

A 7.5% solution comprising 5.45% N-(5-octanoylamido-2-methylpentyl)dithiooxamide/N-(5-octanoylamido-4-methylpentyl)dithiooxamide (G') mixture and 2.05% N,N'-di(5-octanoylamido-2-methylpentyl)dithiooxamide/N-(5-octanoylamido-2-methylpentyl)-N'-(5-octanoyl-4-methylpentyl)dithiooxamide/N,N'-di(5-octanoylamido-4-methylpentyl)/dithiooxamide mixture (G) in the fill solvent mixture of diethyl phthalate, tributyl phosphate, and cyclohexene was encapsulated by the procedure described above. A coating mixture of 10.0 g of capsule slurry, 2.5 g of Dow 620 styrene-butadiene latex, and 62.5 g of 1.5% sodium alginate solution was coated onto paper by the draw down procedure described in Experiment 4 above. The coated CB sheet was neutral in color and when imaged with a CF sheet coated with a nickel$^{2+}$ salt an image was formed with Hunter coordinates of:

L=48.7
a=4.5
b=−16.9

The L value indicates the image is dark and has good contrast on a light background. The values for a and b indicate the image is blue in color.

A blend was prepared of 3.33 g of the capsule slurry containing compound 16, with 10 g of capsule slurry containing 5.45% N-(5-octanoylamido-2-methylpentyl-dithiooxamide/N-(5-octanoylamido-4-methylpentyl)dithiooxamide (G') mixture and 2.05% N,N'-di(5-octanoylamido-2-methylpentyl)dithiooxamide/N-(5-octanoylamido 2-methylpentyl)-N'-(5-octanoyl-4-methylpentyl)dithiooxamide/N,N'-di(5-octanoylamido-4-methylpentyl)dithiooxamide mixture (G). A coating mixture of the combined capsule slurries, 2.5 g of Dow 620 styrene-butadiene latex, and 62.5 g of 1.5% sodium alginate solution was coated onto paper by the draw down procedure described in Experiment 4 above. The coated CB sheet was neutral in color. When imaged with a CF sheet coated with a nickel$^{2+}$ salt an image was formed with Hunter coordinates of:

L=49.6
a=0.4
b=−7.4

The L value indicates the image is dark and has good contrast on a light background. The values of a and b indicate the image is blue/black in color.

A blend was prepared of 6.67 g of the capsule slurry containing compound 16, with 10 g of capsule slurry containing 5.45% N-(5-octanoylamido-2-methylpentyl)dithiooxamide/N-(5-octanoylamido-4-methylpentyl)dithiooxamide (G') mixture and 2.05% N,N'-di(5-octanoylamido-2-methylpentyl)dithiooxamide/N-(5-octanoylamido-2-methylpentyl)-N'-(5-octanoylamido-4-methylpentyl)dithiooxamide/N,N'-di(5-octanolyamido-4-methylpentyl)dithiooxamide mixture (G). A coating mixture of the combined capsule slurries, 2.5 g of Dow 620 styrene-butadiene latex, and 62.5 g of 1.5% sodium alginate solution was coated onto paper by the draw down procedure described in Experiment 4 above. The thus formed coated CB sheet was neutral in color. When imaged with a CF sheet coated with a nickel$^{2+}$ salt an image was formed with Hunter coordinates of:

L=52.7
a=−1.7
b=−1.1

The L value indicates the image is dark and has good contrast on a light background. The values for a and b indicate the image is nearly black in color.

A blend was prepared of 10 g of the capsule slurry containing compound 16, with 10 g of capsule slurry containing 5.45% N-(5-octanoylamido-2-methylpentyl)dithiooxamide/N-(5-octanoylamido-4-methylpentyl)dithiooxamide (G') mixture and 2.05% N,N'-di(5-octanoylamido-2-methylpentyl)dithiooxamide/N-(5-octanoylamido-2-methylpentyl)-N'-(5-octanoylamido-4-methylpentyl)dithiooxamide/N,N'-di(5-octanoylamido-4-methylpentyl)dithiooxamide mixture (G). A coating mixture of the combined capsule slurries, 2.5 g of Dow 620 styrene-butadiene latex, and 62.5 g of 1.5% sodium alginate solution was coated onto paper by the draw down procedure described in Experiment 4 above. The thus formed coated CB sheet was neutral in color. When imaged with a CF sheet coated with a nickel$^{2+}$ salt an image was formed with Hunter coordinates of:

L=55.1
a=−3.0
b=3.3

The L value indicates the image is dark and has good contrast on a light background. The values for a and b indicate the image is yellowish-green in color.

EXPERIMENT 9

Determination of Colors on CB Sheets

The colors of $Zn^{2+}$ complexes of the yellow color-formers were determined by preparing a solution of the indicated concentration of each color-former in a solvent composed of a mixture of tributyl phosphate (26.5%), diethyl phthalate (17.6%), and cyclohexane (55.9%). The images were formed by applying a stripe of the color-former solution onto a white 3M Carbonless Paper Blue/Purple Image CB sheet containing zinc rosinate (manufactured by the Carbonless Products Department of 3M Company, St. Paul, Minn.) using a cotton tipped applicator swab. The visually observed colors are listed in Table 2. The color of compounds 20 and 21 of Yarian (see U.S. Pat. No. 4,334,015) on a CB sheet is included for comparison and demonstrates that they form yellow colors on zinc rosinate treated CB sheets.

The invention has been described with reference to various specific and preferred embodiments and techniques. It should be understood, however, that many variations and modifications may be made while remaining within the spirit and scope of the invention.

TABLE 1

Volatility of Yellow Color-formers

| Ref. No. | Volatility RT | 49° C. | 60° C. | 71° C. |
|---|---|---|---|---|
| 1 | Nonvolatile | | | |
| 2 | Volatile | | | |
| 3 | Slightly Volatile | Volatile | Volatile | Volatile |
| 4 | Nonvolatile | Slightly Volatile | Volatile | Volatile |
| 5 | Nonvolatile | Nonvolatile | Nonvolatile | Slightly Volatile |
| 6 | Nonvolatile | Nonvolatile | Nonvolatile | Nonvolatile |
| 7 | Nonvolatile | Slightly Volatile | Volatile | Volatile |
| 14 | Nonvolatile | Nonvolatile | Nonvolatile | Nonvolatile |
| 16 | Nonvolatile | Nonvolatile | Nonvolatile | Nonvolatile |

TABLE 2

Color Coordinates of NI(II) Complexes of Yellow Color-formers

| Ref. No. | *Dye Conc. | Color on CB | Visual Image Color | Hunter Coordinates L | a | b |
|---|---|---|---|---|---|---|
| 1 | 2.5% | Colorless | Yellow | 76.3 | 1.6 | 31.1 |
| 2 | 2.5% | Colorless | Yellow | 88.4 | −16.5 | 38.0 |
| 3 | 2.5% | Colorless | Yellow | 87.8 | −16.4 | 40.0 |
| 4 | 2.5% | Colorless | Yellow | 88.6 | −15.8 | 36.6 |
| 5 | 2.5% | Colorless | Yellow | 88.2 | −16.2 | 38.4 |
| 6 | 2.5% | Colorless | Yellow | 88.9 | −15.7 | 36.1 |
| 7 | 2.5% | Colorless | Yellow | 88.5 | −16.6 | 38.6 |
| 8 | 1.0% | Yellow | Gold | 74.3 | 4.3 | 32.0 |
| 9 | 1.0% | Yellow | Yellow | 88.5 | −15.0 | 37.2 |
| 10 | **2.5% | Colorless | Yellow | 86.9 | −11.9 | 42.8 |
| 11 | 1.0% | Colorless | Pale Yellow | 86.2 | −5.3 | 21.9 |
| 12 | 1.0% | Pale Yellow | Pale Yellow | 87.3 | −7.6 | 24.3 |

TABLE 2-continued

Color Coordinates of NI(II) Complexes of Yellow Color-formers

| Ref. No. | *Dye Conc. | Color on CB | Visual Image Color | Hunter Coordinates L | a | b |
|---|---|---|---|---|---|---|
| 13 | ***1.0% | Colorless | Pale Yellow | 90.1 | −5.1 | 15.5 |
| 14 | 2.5% | Pale Yellow | Yellow | 82.4 | −7.7 | 34.2 |
| 15 | 2.5% | Yellow | Intense Yellow | 78.3 | −8.1 | 42.6 |
| 16 | 2.5% | Pale Yellow | Yellow | 77.3 | −4.3 | 40.2 |
| 17 | 2.5% | Pale Yellow | Yellow | 75.3 | −4.2 | 38.5 |
| 18 | 1.0% | Pale Yellow | Yellow | 89.0 | −8.6 | 21.6 |
| Compounds from D. R. Yarian [U.S. Pat. No. 4,334,015 (1982)]: | | | | | | |
| 20 | 1.0% | Yellow | Yellow | 88.7 | −14.5 | 33.4 |
| 21 | 1.0% | Yellow | Yellow | 86.9 | −13.2 | 35.5 |

*Dye Concentration
**Dye Swab in o-dichlorobenzene
***Dye Swab in tetrahydrofuran

TABLE 3

Color Coordinates of Ni(H) Complexes of Mixtures of Yellow Color-formers with Magenta and Cyan Color-formers

| Weight Ratio | Class of Compound** | Ref. No. | *Dye Conc. | Visual Image Color | Hunter Coordinates L | a | b |
|---|---|---|---|---|---|---|---|
| 38% | Yellow Color-former | 1 | 2.5% | Black | 44.7 | 0.2 | −2.0 |
| 28% | Magenta Color-former | A | | | | | |
| 34% | Cyan Color-former | B' | | | | | |
| 44% | Yellow Color-former | 1 | 2.5% | Black | 45.0 | 0.7 | −1.1 |
| 17% | Magenta Color-former | B | | | | | |
| 39% | Cyan Color-former | B' | | | | | |
| 57% | Yellow Color-former | 6 | 2.5% | Black | 55.3 | −0.8 | 0.0 |
| 24% | Magenta Color-former | B | | | | | |
| 19% | Cyan Color-former | B' | | | | | |
| 52% | Yellow Color-former | 6 | 1.0% | Black | 66.2 | 0.8 | 0.0 |
| 16% | Magenta Color-former | F | | | | | |
| 32% | Cyan Color-former | F' | | | | | |
| 50% | Yellow Color-former | 6 | 2.0% | Black | 54.5 | 1.4 | −2.9 |
| 35% | Magenta Color-former | A | | | | | |
| 15% | Cyan Color-former | B' | | | | | |
| 47% | Yellow Color-former | 10 | 2.5% | Black | 48.1 | −1.4 | 0.2 |
| 29% | Magenta Color-former | A | | | | | |
| 24% | Cyan Color-former | A' | | | | | |
| 44% | Yellow Color-former | 14 | 2.5% | Black | 48.7 | 0.6 | −1.5 |
| 19% | Magenta Color-former | A | | | | | |
| 37% | Cyan Color-former | B' | | | | | |
| 49% | Yellow Color-former | 14 | 2.5% | Black | 46.0 | −0.6 | −0.4 |
| 14% | Magenta Color-former | B | | | | | |
| 37% | Cyan Color-former | B' | | | | | |
| 27% | Yellow Color-former | 16 | 2.5% | Black | 42.8 | 0.5 | −0.5 |
| 36% | Magenta Color-former | A | | | | | |
| 37% | Cyan Color-former | B' | | | | | |
| 26% | Yellow Color-former | 16 | 2.5% | Black | 44.7 | 0.6 | 0.3 |
| 32% | Magenta Color-fomer | B | | | | | |
| 42% | Cyan Color-former | B' | | | | | |
| 20% | Yellow Color-former | 16 | 2.5% | Black | 44.6 | −1.5 | −3.6 |
| 30% | Magenta Color-former | C | | | | | |
| 50% | Cyan Color-former | C' | | | | | |
| 23% | Yellow Color-former | 16 | 2.5% | Black | 46.2 | −0.3 | −0.7 |
| 45% | Magenta Color-former | D | | | | | |
| 32% | Cyan Color-former | D' | | | | | |
| 24% | Yellow Color-former | 16 | 2.5% | Black | 45.7 | −1.3 | −0.2 |
| 37% | Magenta Color-former | A | | | | | |
| 39% | Cyan Color-former | E' | | | | | |
| 29% | Yellow Color-former | 16 | 2.5% | Black | 44.3 | 0.8 | 0.4 |
| 9% | Magenta Color-former | F | | | | | |
| 62% | Cyan Color-former | F' | | | | | |
| 31% | Yellow Color-former | 16 | 2.0% | Black | 46.3 | −1.0 | 0.8 |
| 40% | Magenta Color-former | G | | | | | |
| 29% | Cyan Color-former | G' | | | | | |
| 56% | Yellow Color-former | 6 | 2.0% | Black | 56.8 | 0.4 | 0.7 |
| 15% | Magenta Color-former | A | | | | | |
| 18% | Magenta Color-former | H | | | | | |
| 11% | Magenta Color-former | I | | | | | |
| 50% | Yellow Color-former | 16 | 2.5% | Light | 57.1 | 6.7 | 17.1 |
| 50% | Magenta Color-former | B | Brown | | | | |
| 50% | Yellow Color-former | 16 | 2.5% | Green | 44.9 | −6.3 | 8.6 |
| 50% | Cyan Color-former | B' | | | | | |
| 67% | Yellow Color-former | 16 | 2.5% | Olive | 54.9 | −3.4 | 18.9 |
| 16.5% | Magenta Color-former | B | | | | | |

TABLE 3-continued

Color Coordinates of Ni(H) Complexes of Mixtures of Yellow Color-formers with Magenta and Cyan Color-formers

| Weight Ratio | Class of Compound** | Ref. No. | *Dye Conc. | Visual Image Color | Hunter Coordinates L | a | b |
|---|---|---|---|---|---|---|---|
| 16.5% | Cyan Color-former | B' | | | | | |
| 16.5% | Yellow Color-former | 16 | 2.5% | Red | 46.5 | 9.2 | −3.7 |
| 67% | Magenta Color-former | B | | | | | |
| 16.5% | Cyan Color-former | B' | | | | | |
| 16.5% | Yellow Color-former | 16 | 2.5% | Blue | 40.0 | 0.5 | −7.4 |
| 16.5% | Magenta Color-former | B | Black | | | | |
| 67% | Cyan Color-former | B' | | | | | |
| 33.3% | Yellow Color-former | 16 | 2.5% | Dark | 47.1 | −0.2 | 3.5 |
| 33.3% | Magenta Color-former | B | Brown | | | | |
| 33.3% | Cyan Color-former | B' | | | | | |

*Dye Concentration
**See Table 5 for molecular structures

TABLE 4

Color Coordinates of Ni(II) Complexes of Encapsulated Mixtures of Yellow Color-formers with Magenta and Cyan Color-formers

| Weight Ratio | Class of Compound** | Ref. No. | *Dye Conc. | Visual Image Color | Hunter Coordinates L | a | b |
|---|---|---|---|---|---|---|---|
| 44% | Yellow Color-former | 14 | 11.5% | Black | 52.7 | 1.2 | −3.9 |
| 19% | Magenta Color-former | A | | | | | |
| 37% | Cyan Color-former | B' | | | | | |
| 49% | Yellow Color-former | 14 | 10% | Black | 56.2 | −0.2 | −2.5 |
| 14% | Magenta Color-former | B | | | | | |
| 37% | Cyan Color-former | B' | | | | | |
| 27% | Yellow Color-former | 16 | 11.5% | Black | 49.6 | 1.7 | −1.4 |
| 36% | Magenta Color-former | A | | | | | |
| 37% | Cyan Color-former | B' | | | | | |
| 26% | Yellow Color-former | 16 | 10% | Black | 49.6 | 0.6 | −3.6 |
| 32% | Magenta Color-former | B | | | | | |
| 42% | Cyan Color-former | B' | | | | | |
| 31% | Yellow Color-former | 16 | 10% | Black | 46.3 | 1.3 | 0.9 |
| 40% | Magenta Color-former | G | | | | | |
| 29% | Cyan Color-former | G' | | | | | |

*Dye Concentration in fill solvent
**See Table 5 for molecular structures

TABLE 5

Representative Compounds of Structure I

| Structure | Ref. No. |
|---|---|
| 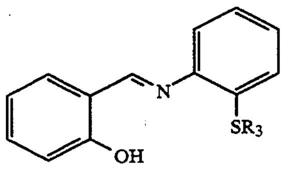 | 1 $R_2 = H$<br>2 $R_2 = CH_3$<br>3 $R_2 = n\text{-}C_4H_9$<br>4 $R_2 = n\text{-}C_8H_{17}$<br>5 $R_2 = n\text{-}C_{10}H_{21}$<br>6 $R_2 = n\text{-}C_{12}H_{25}$<br>7 $R_2 = CH_2—C_6H_5$ |
| 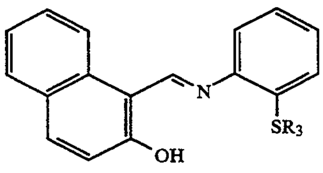 | 8 $R_2 = H$<br>9 $R_2 = C_{10}H_{21}$ |
| 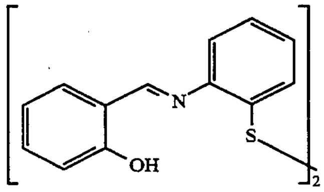 | 10 |

TABLE 5-continued

| Representative Compounds of Structure I | |
|---|---|
| Structure | Ref. No. |
| 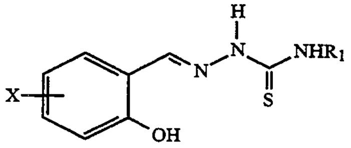 | 11 $R_1 = H$<br>$X = H$<br>12 $R_1 = H$<br>$X = 3,5\text{-diBr}$<br>13 $R_1$ = cyclohexyl<br>$X = 3\text{-EtO}$<br>14 $R_1$ = phenyl<br>$X = H$ |
| 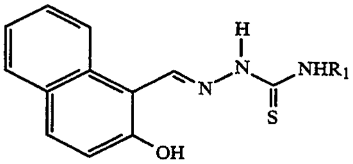 | 15 $R_1$ = phenyl |
| 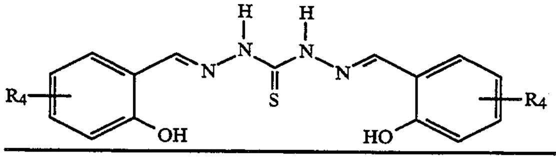 | 16 $R_4 = H$<br>17 $R_4 = 3,5\text{-di-}C(CH_3)_3$<br>18 $R_4 = 4\text{-}CH_3O$ |

We claim:

1. A composition capable of forming colored complexes with transition metal salts comprising: (a) a shell wall and (b) a liquid fill material therein comprising an aromatic substituted compound carried in an organic solvent, said aromatic substituted compound having the formula:

Ar—CH=N—R I wherein Ar is aryl having a hydroxyl group ortho- or peri- to the site of attachment of the linking carbon atom attached to the nitrogen atom; and R is selected from the group consisting of:

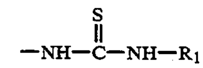 (i)

wherein $R_1$ is selected from the group consisting of: hydrogen, alkyl, cycloalkyl and aryl;

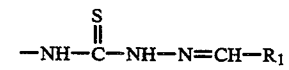 (ii)

wherein $R_1$ is as defined above; and (iii)

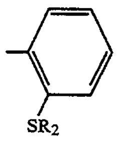

wherein $R_2$ is selected from the group consisting of hydrogen, alkyl, cycloalkyl, branched alkyl, substituted alkyl, alkylethers, alkylamides. alkylesters, and disulfides.

2. A microencapsulated composition according to claim 1 wherein said aromatic substituted compound is present in said organic solvent in an amount of between 0.2 and 10.0 percent by weight of the capsule fill.

3. A microencapsulated composition according to claim 1 wherein Ar is selected from the group consisting of phenyl, substituted phenyl, naphthyl, and substituted naphthyl.

4. A microencapsulated composition according to claim 1 wherein $R_1$ is selected from the group consisting of phenyl, substituted phenyl, naphthyl, and substituted naphthyl.

5. A microencapsulated composition according to claim 1 wherein aromatic substituted compound is represented by the formula:

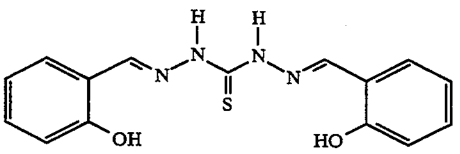

6. A microencapsulated composition according to claim 1 wherein said fill further comprises an N-(monosubstituted)dithiooxamide, an N,N'-(disubstituted)dithiooxamide, or a mixture thereof.

* * * * *